US012672081B2

(12) United States Patent
Lim et al.

(10) Patent No.: US 12,672,081 B2
(45) Date of Patent: Jun. 30, 2026

(54) METHOD AND APPARATUS FOR TIMING ALIGNMENT BASED ON SCHEDULING REQUEST

(71) Applicant: ELECTRONICS AND TELECOMMUNICATIONS RESEARCH INSTITUTE, Daejeon (KR)

(72) Inventors: Soon Yong Lim, Daejeon (KR); Mi Jeong Yang, Daejeon (KR); Sung Min Oh, Daejeon (KR); You Sun Hwang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 639 days.

(21) Appl. No.: 18/090,936

(22) Filed: Dec. 29, 2022

(65) Prior Publication Data

US 2023/0224841 A1 Jul. 13, 2023

(30) Foreign Application Priority Data

Jan. 7, 2022 (KR) ........................ 10-2022-0002578

(51) Int. Cl.
*H04W 56/00* (2009.01)
*H04L 1/1812* (2023.01)
*H04W 72/12* (2023.01)
*H04W 72/231* (2023.01)

(52) U.S. Cl.
CPC ....... *H04W 56/0045* (2013.01); *H04L 1/1812* (2013.01); *H04W 72/12* (2013.01); *H04W 72/231* (2023.01)

(58) Field of Classification Search
CPC ............. H04W 56/0045; H04W 72/12; H04W 72/231; H04W 56/0005; H04W 72/23; H04W 4/70; H04W 72/1268; H04W 72/21; H04W 72/232; H04W 74/004;
(Continued)

(56) References Cited

U.S. PATENT DOCUMENTS

| | | | |
|---|---|---|---|
| 9,554,308 B2 | 1/2017 | Ambriss et al. | |
| 10,194,426 B2 | 1/2019 | Lee et al. | |
| 10,939,470 B2 | 3/2021 | Hosseini et al. | |

(Continued)

FOREIGN PATENT DOCUMENTS

| | | |
|---|---|---|
| KR | 1020160108829 A | 9/2016 |
| WO | 2020/149660 A1 | 7/2020 |

OTHER PUBLICATIONS

Huawei, HiSilicon, On support for transmission in preconfigured UL resources, 3GPP TSG RAN WG1 Meeting #94, Gothenburg, Sweden, Aug. 20-24, 2018, R1-1808108 (Year: 2018).*

(Continued)

*Primary Examiner* — Ayaz R Sheikh
(74) *Attorney, Agent, or Firm* — Rabin & Berdo, P.C.

(57) ABSTRACT

An operation method of a terminal in a communication system may comprise: in response to occurrence of uplink (UL) data, transmitting a scheduling request (SR) for the UL data to a base station; performing a UL timing alignment procedure with the base station when a UL timing between the terminal and the base station is not synchronized; receiving a UL grant for the UL data from the base station; and transmitting the UL data to the base station using resources indicated by the UL grant.

14 Claims, 6 Drawing Sheets

(58) Field of Classification Search
CPC ............. H04W 74/0833; H04L 1/1812; H04L
1/1671; H04L 1/1822; H04L 1/1854;
H04L 1/1896
See application file for complete search history.

(56) References Cited

U.S. PATENT DOCUMENTS

| | | | |
|---|---|---|---|
| 11,032,838 B2 | 6/2021 | Park et al. | |
| 2017/0013610 A1* | 1/2017 | Lee ........................ | H04W 72/21 |
| 2020/0221433 A1* | 7/2020 | Park ..................... | H04L 1/1812 |
| 2020/0305191 A1 | 9/2020 | Moon et al. | |
| 2021/0120581 A1 | 4/2021 | Kim | |
| 2021/0144734 A1 | 5/2021 | Rashid et al. | |
| 2021/0352717 A1 | 11/2021 | Lee et al. | |
| 2024/0155643 A1* | 5/2024 | Khoshkholgh Dashtaki ............... | |
| | | | H04L 1/1822 |

OTHER PUBLICATIONS

3GPP TS 36.321 V16.6.0 (Sep. 2021), 3rd Generation Partnership Project; Technical Specification Group Radio Access Network; Evolved Universal Terrestrial Radio Access (E-UTRA); Medium Access Control (MAC) protocol specification (Release 16), pp. 1-141.
Huawei, HiSilicon, "On support for transmission in preconfigured UL resources", Agenda Item: 6.2.2.2, R1-1808108, 3GPP TSG RAN WG1 Meeting #94, Gothenburg, Sweden, Aug. 20-24, 2018.

* cited by examiner

METHOD AND APPARATUS FOR TIMING ALIGNMENT BASED ON SCHEDULING REQUEST

CROSS-REFERENCE TO RELATED APPLICATIONS

This application claims priority to Korean Patent Application No. 10-2022-0002578, filed on Jan. 7, 2022, with the Korean Intellectual Property Office (KIPO), the entire contents of which are hereby incorporated by reference.

BACKGROUND

1. Technical Field

Exemplary embodiments of the present disclosure relate to an uplink timing alignment technique in a communication system, and more particularly, to a technique for aligning uplink timing based on a scheduling request in narrowband-Internet of things (NB-IoT).

2. Related Art

With the development of information and communication technologies, various wireless communication technologies are being developed. As the representative wireless communication technologies, there may be long term evolution (LTE), new radio (NR), or the like defined as the 3rd generation partnership project (3GPP) specifications. The LTE may be one of 4th generation (4G) wireless communication technologies, and the NR may be one of 5th generation (5G) wireless communication technologies.

For the processing of rapidly increasing wireless data after the commercialization of the 4th generation (4G) communication system (e.g., Long Term Evolution (LTE) communication system or LTE-Advanced (LTE-A) communication system), the 5th generation (5G) communication system (e.g., new radio (NR) communication system) that uses a frequency band (e.g., a frequency band of 6 GHz or above) higher than that of the 4G communication system as well as a frequency band of the 4G communication system (e.g., a frequency band of 6 GHz or below) is being considered. The 5G communication system may support enhanced Mobile BroadBand (eMBB), Ultra-Reliable and Low-Latency Communication (URLLC), and massive Machine Type Communication (mMTC).

Meanwhile, the communication system may support narrowband-Internet of things (NB-IoT). In the communication system supporting NB-IoT, when uplink (UL) data occurs, a terminal may transmit a scheduling request (SR) to a base station through a random access procedure. For example, the SR may be transmitted on a narrowband physical random access channel (NPRACH). The base station may receive the SR from the terminal, and may transmit a UL grant to the terminal in response to the SR. The terminal may receive the UL grant from the base station, and may transmit the UL data to the base station using resources indicated by the UL grant. However, when UL synchronization between the terminal and the base station is not maintained, reception performance of the above-described UL data at the base station may be deteriorated. Therefore, methods for solving the above-described problem are needed.

SUMMARY

Exemplary embodiments of the present disclosure provide a method and an apparatus for aligning uplink timing based on a SR in a communication system supporting narrowband-Internet of things (NB-IoT).

According to a first exemplary embodiment of the present disclosure, an operation method of a terminal in a communication system may comprise: in response to occurrence of uplink (UL) data, transmitting a scheduling request (SR) for the UL data to a base station; performing a UL timing alignment procedure with the base station when a UL timing between the terminal and the base station is not synchronized; receiving a UL grant for the UL data from the base station; and transmitting the UL data to the base station using resources indicated by the UL grant.

The performing of the UL timing alignment procedure may comprise: receiving downlink (DL) allocation information from the base station; receiving a timing advance command (TAC) medium access control (MAC) control element (CE) from the base station using resources indicated by the DL allocation information; aligning UL timing synchronization between the terminal and the base station based on a TAC included in the TAC MAC CE; and transmitting a hybrid automatic repeat request (HARD)-acknowledgement (ACK) for the TAC MAC CE to the base station.

The DL allocation information may be included in downlink control information (DCI), and the DCI may be scrambled by a radio temporary network identifier (RTNI) indicating transmission of the TAC MAC CE.

The SR may be transmitted on a narrowband physical random access channel (NPRACH), and each of the DL allocation information and the UL grant may be received on a narrowband physical downlink control channel (NPDCCH).

The operation method may further comprise performing a synchronization procedure with the base station before transmitting the SR to the base station, wherein the UL timing alignment procedure is performed before transmission of the UL data when a UL timing determined by the synchronization procedure needs to be adjusted.

A SR-prohibit timer may be started when the SR is transmitted, and the SR-prohibit timer may be restarted when the TAC MAC CE is received.

According to a second exemplary embodiment of the present disclosure, an operation method of a base station in a communication system may comprise: receiving a scheduling request (SR) for uplink (UL) data from a terminal; performing a UL timing alignment procedure with the terminal when a UL timing between the terminal and the base station is not synchronized; transmitting a UL grant for the UL data to the terminal; and receiving the UL data from the terminal through resources indicated by the UL grant.

The performing of the UL timing alignment procedure may comprise: transmitting downlink (DL) allocation information to the terminal; transmitting a timing advance command (TAC) medium access control (MAC) control element (CE) to the terminal using resources indicated by the DL allocation information; and receiving a hybrid automatic repeat request (HARQ)-acknowledgement (ACK) for the TAC MAC CE from the terminal.

The SR may be received on a narrowband physical random access channel (NPRACH), and each of the DL allocation information and the UL grant may be transmitted on a narrowband physical downlink control channel (NPDCCH).

The operation method may further comprise performing a synchronization procedure with the terminal before receiving the SR, wherein the UL timing alignment procedure is performed before reception of the UL data when a UL timing determined by the synchronization procedure needs to be adjusted.

According to a third exemplary embodiment of the present disclosure, an operation method of a terminal in a communication system may comprise: in response to occurrence of uplink (UL) data, transmitting a scheduling request (SR) for the UL data to a base station; receiving downlink (DL) allocation information from the base station; receiving a medium access control (MAC) protocol data unit (PDU) from the base station using resources indicated by the DL allocation information, the MAC PDU including a timing advance command (TAC) for UL timing alignment between the terminal and the base station and a UL grant for the UL data; aligning UL timing synchronization between the terminal and the base station based on the TAC; and transmitting the UL data to the base station using resources indicated by the UL grant.

The operation method may further comprise performing a synchronization procedure with the base station before transmitting the SR to the base station, wherein the MAC PDU is received when a UL timing determined by the synchronization procedure needs to be adjusted.

The MAC PDU may include a MAC header and a MAC payload, the MAC payload may be a scheduling request response (SRR) MAC control element (CE) including the TAC and the UL grant, and a logical channel identifier (LCID) included in the MAC header may indicate that the MAC PDU includes the SRR MAC CE.

The DL allocation information may be included in downlink control information (DCI), and the DCI may be scrambled by a radio temporary network identifier (RTNI) indicating transmission of the SRR MAC CE.

A hybrid automatic repeat request (HARQ)-acknowledgment (ACK) for the MAC PDU may be configured not to be transmitted.

According to the present disclosure, when UL data occurs, a terminal may transmit a SR on a NPRACH. The base station may determine whether UL timing is synchronized based on the SR received from the terminal. When UL timing is synchronized, the base station may transmit a UL grant to the terminal in response to the SR. On the other hand, when the UL timing is not synchronized, a UL timing alignment procedure may be performed between the base station and the terminal. When the UL timing alignment procedure is completed, the base station may transmit a UL grant for the SR to the terminal. The UL grant and a TAC for the UL timing alignment procedure may be transmitted through different MAC CEs or the same MAC CE. According to the above-described operation, reception performance of the UL data at the base station can be improved.

DETAILED DESCRIPTION OF THE EMBODIMENTS

Figure 1:
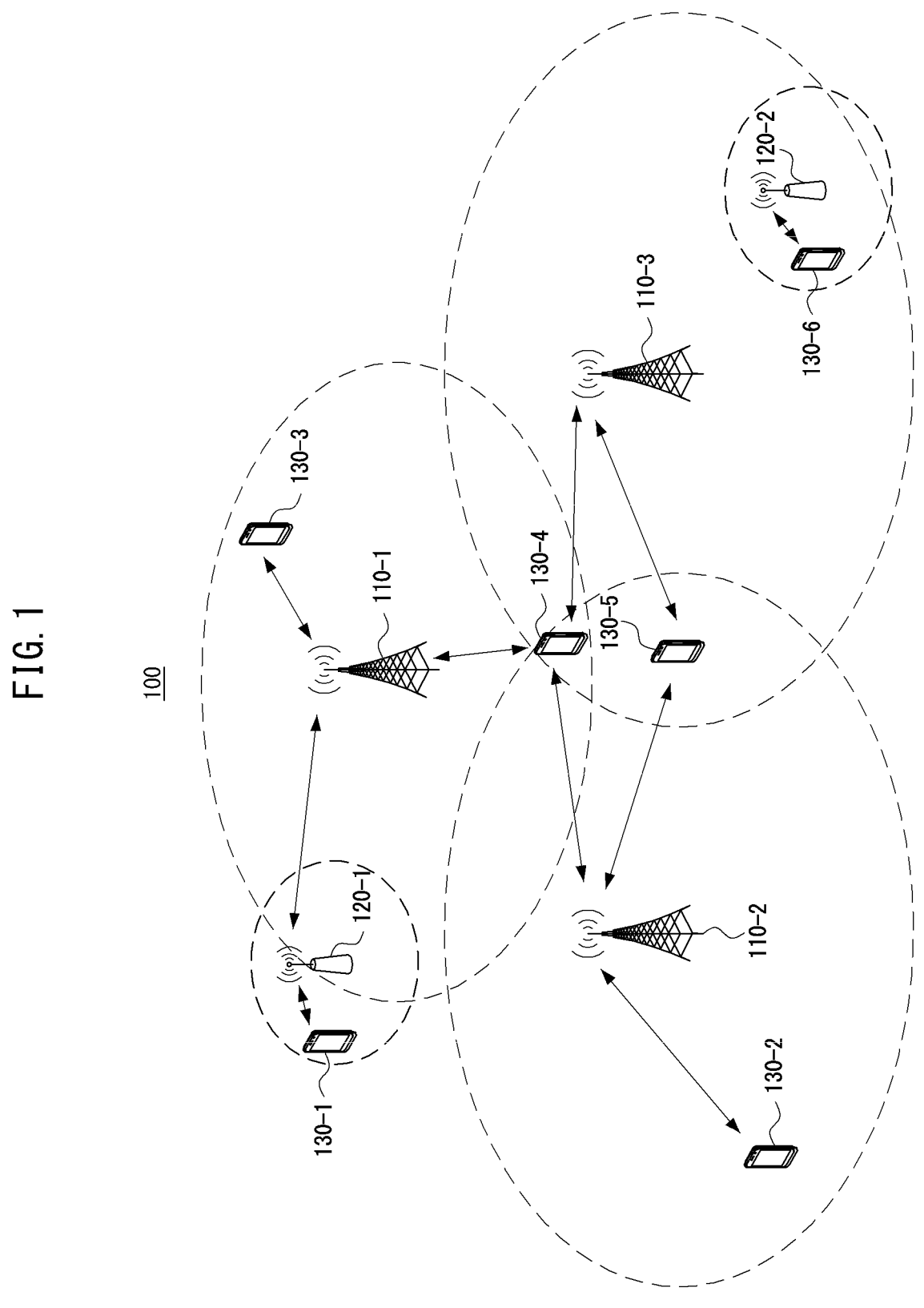
FIG. 1 is a conceptual diagram illustrating a first exemplary embodiment of a communication system.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may be used in the same sense as a communication network.

FIG. 1 is a conceptual diagram illustrating a first exemplary embodiment of a communication system.

Referring to FIG. 1, a communication system 100 may include a plurality of communication nodes 110-1, 110-2, 110-3, 120-1, 120-2, 130-1, 130-2, 130-3, 130-4, 130-5, and 130-6. In addition, the communication system 100 may further include a core network (e.g., serving-gateway (S-GW), packet data network (PDN)-gateway (P-GW), and mobility management entity (MME)). When the communication system 100 is the 5G communication system (e.g., NR system), the core network may include an access and mobility management function (AMF), a user plane function (UPF), a session management function (SMF), and the like.

The plurality of communication nodes 110 to 130 may support the communication protocols (e.g., LTE communication protocol, LTE-A communication protocol, NR communication protocol, etc.) defined by technical specifications of 3rd generation partnership project (3GPP). The plurality of communication nodes 110 to 130 may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like. Each of the plurality of communication nodes may have the following structure.

Figure 2:
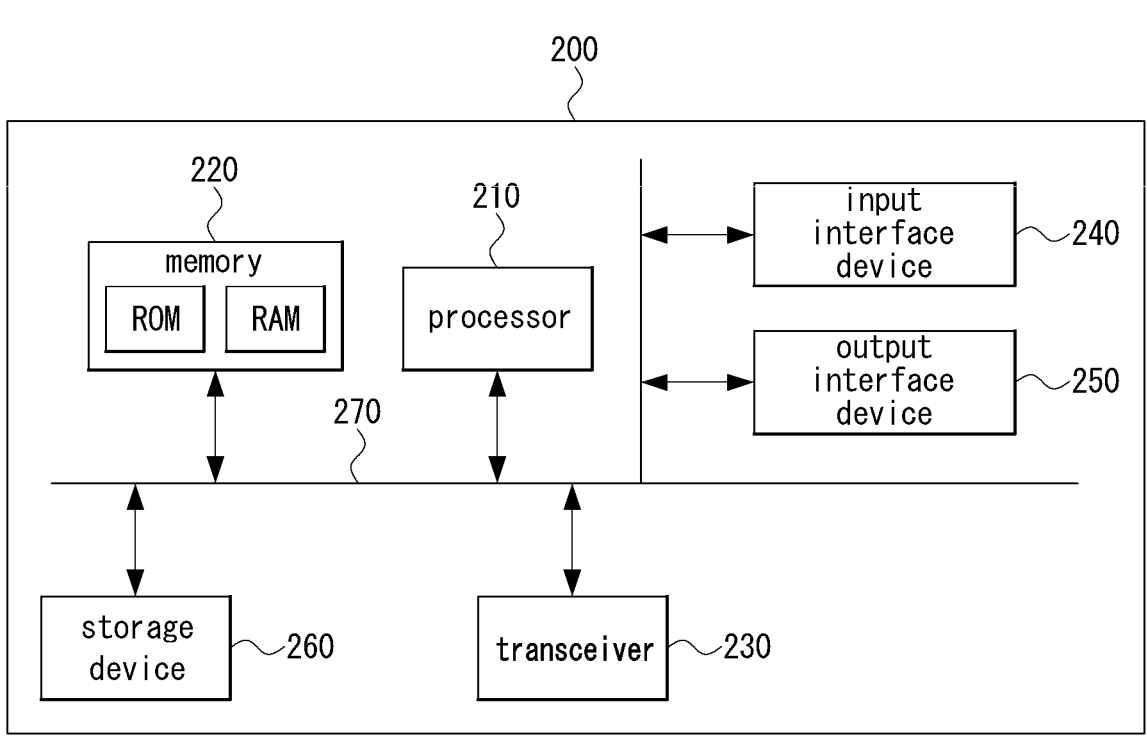
FIG. 2 is a block diagram illustrating a first exemplary embodiment of a communication node constituting the communication system.

FIG. 2 is a block diagram illustrating a first exemplary embodiment of a communication node constituting the communication system.

Referring to FIG. 2, a communication node 200 may include at least one processor 210, a memory 220, and a transceiver 230 connected to a network to perform communication. In addition, the communication node 200 may further include an input interface device 240, an output interface device 250, a storage device 260, and the like. The components included in the communication node 200 may be connected by a bus 270 to communicate with each other.

However, each component included in the communication node 200 may be connected to the processor 210 through a separate interface or a separate bus instead of the common bus 270. For example, the processor 210 may be connected to at least one of the memory 220, the transceiver 230, the input interface device 240, the output interface device 250, and the storage device 260 through a dedicated interface.

The processor 210 may execute at least one instruction stored in at least one of the memory 220 and the storage device 260. The processor 210 may refer to a central processing unit (CPU), a graphics processing unit (GPU), or a dedicated processor on which the methods according to the exemplary embodiments of the present disclosure are performed. Each of the memory 220 and the storage device 260 may be configured as at least one of a volatile storage medium and a nonvolatile storage medium. For example, the memory 220 may be configured with at least one of a read only memory (ROM) and a random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, an evolved Node-B (eNB), an advanced base station (BTS), a high reliability-base station (HR-BS), a base transceiver station (BTS), a radio base station, a radio transceiver, an access point, an access node, a radio access station (RAS), a mobile multi-hop relay base station (MMR-BS), a relay station (RS), an advanced relay station (ARS), a high reliability-relay station (HR-RS), a home NodeB (HNB), a home eNodeB (HeNB), a roadside unit (RSU), a radio remote head (RRH), a transmission point (TP), a transmission and reception point (TRP), a macro cell, a pico cell, a micro cell, a femto cell, or the like.

Each of the plurality of terminals 130-1, 130-2, 130-3, 130-4, 130-5, and 130-6 may refer to a user equipment (UE), a terminal equipment (TE), an advanced mobile station (AMS), a high reliability-mobile station (HR-MS), a terminal, an access terminal, a mobile terminal, a station, a subscriber station, a mobile station, a portable subscriber station, a node, a device, an on board unit (OBU), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support multi-input multi-output (MIMO) transmission (e.g., a single-user MIMO (SU-MIMO), multi-user MIMO (MU-MIMO), massive MIMO, or the like), coordinated multipoint (CoMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, operation methods of a communication node in a communication system will be described. Even when a method (e.g., transmission or reception of a data packet) performed at a first communication node among communication nodes is described, the corresponding second communication node may perform a method (e.g., reception or transmission of the data packet) corresponding to the method performed at the first communication node. That is, when an operation of a terminal is described, a corresponding base station may perform an operation corresponding to the operation of the terminal. Conversely, when an operation of a base station is described, a corresponding terminal may perform an operation corresponding to the operation of the base station.

The communication system may support narrowband-Internet of things (NB-IoT). In the communication system supporting NB-IoT, a terminal may transmit a scheduling request (SR) to a base station through a random access procedure and/or uplink control information (UCI). To support the above-described operation, the base station may signal SR configuration information to the terminal. In exemplary embodiments, signaling may mean one or a combination of two or more of system information signaling, radio resource control (RRC) message signaling, medium access control (MAC) control element (CE) signaling, or physical layer control information (e.g., downlink control information (DCI), UCI, and sidelink control information (SCI)) signaling. The SR configuration information may be configured as shown in Tables 1 and 2 below.

TABLE 1

```
SchedulingRequestConfig-NB-r15 ::=        SEQUENCE {
        sr-WithHARQ-ACK-Config-r15                      ENUMERATED {true}      OPTIONAL,
        sr-WithoutHARQ-ACK-Config-r15                   SR-WithoutHARQ-ACK-Config-NB-r15
        OPTIONAL,      -- Need ON
        sr-SPS-BSR-Config-r15                           SR-SPS-BSR-Config-NB-r15
                OPTIONAL,        -- Need ON
        ...
}
SR-WithoutHARQ-ACK-Config-NB-r15 ::= CHOICE {
        release                                         NULL,
        setup                                           SEQUENCE {
                sr-ProhibitTimer-r15            INTEGER (0..7)            OPTIONAL,
        -- Need ON
                sr-NPRACH-Resource-r15          SR-NPRACH-Resource-NB-
        r15  OPTIONAL -- Need ON
        }
}
```

TABLE 2

```
SR-NPRACH-Resource-NB-r15        ::=     SEQUENCE {
        nprach-CarrierIndex-r15                              INTEGER    (0..maxNonAnchorCarriers-
NB-r14),
        nprach-ResourceIndex-r15                             INTEGER (1..maxNPRACH-Resources-NB-r13),
        nprach-SubCarrierIndex-r15                           CHOICE {
                nprach-Fmt0Fmt1-r15                                  INTEGER (0..47),
                nprach-Fmt2-r15                                      INTEGER (0..143)
        },
        p0-SR-r15                                            INTEGER (–126..24),
        alpha-r15                                            ENUMERATED  {al0,
al04, al05, al06, al07, al08, al09, al1}}
SR-SPS-BSR-Config-NB-r15         ::= CHOICE {
        release                                              NULL,
        setup                                                SEQUENCE {
                semiPersistSchedC-RNTI-r15           C-RNTI,
                semiPersistSchedIntervalUL-r15       ENUMERATED {sf128, sf256, sf512,
sf1024, sf1280, sf2048, sf2560, sf5120}
        }
}
```

The terminal may receive the SR configuration information from the base station, may identify information element(s) included in the SR configuration information (e.g., information element(s) defined in Tables 1 and 2), and transmit a SR based on the SR configuration information. When sr-WithHARQ-ACK-Config is configured as 'true', the terminal may transmit the SR by multiplexing the SR with hybrid automatic repeat request (HARQ)-acknowledgment (ACK). For example, the terminal may transmit UCI including the SR and the HARQ-ACK. When sr-WithoutHARQ-ACK-Config is configured, the terminal may transmit the SR without multiplexing with HARQ-ACK. In this case, the terminal may transmit the SR on a narrowband physical random access channel (NPRACH). The NPRACH used for SR transmission may be referred to as a SR-NPRACH. The terminal may transmit the SR to the base station on a SR-NPRACH indicated by SR-NPRACH-Resource-NB included in the SR configuration information.

In addition, the SR configuration information may further include sr-ProhibitTimer (hereinafter referred to as 'SR-prohibit timer'). The SR-prohibit timer may be started when the SR is transmitted, and a (re)transmission operation of the SR may be prohibited for a time corresponding to the SR-prohibit timer (e.g., until the SR-prohibit timer expires). In exemplary embodiments, a (re)transmission operation may mean a transmission operation and/or a retransmission operation.

Figure 3:
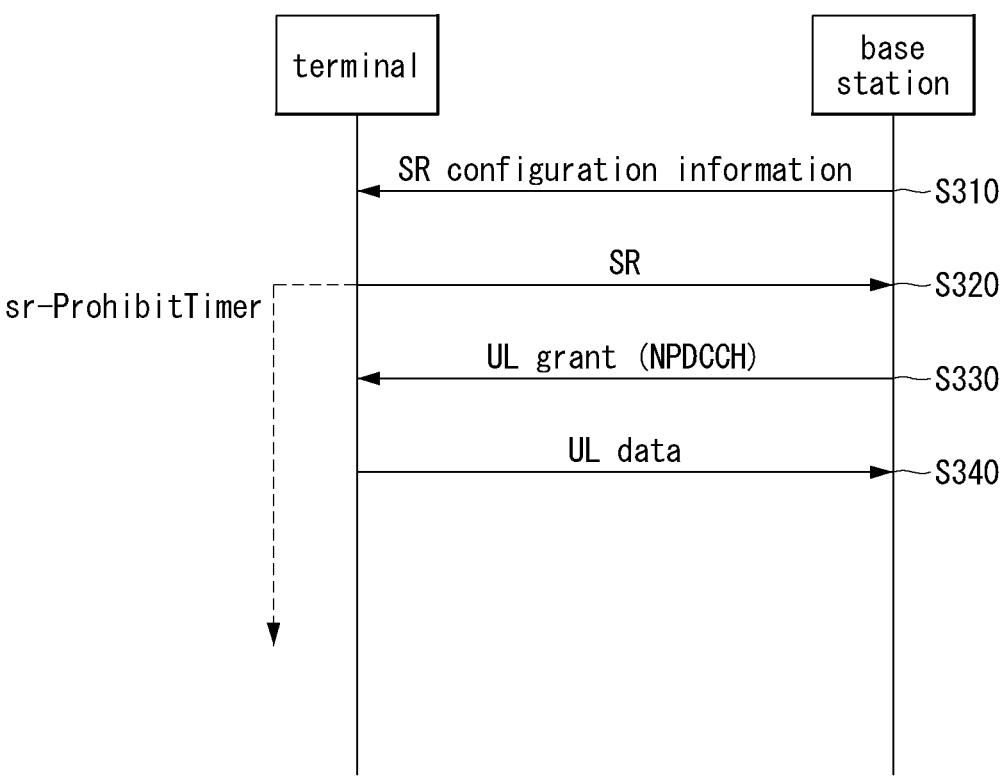
FIG. 3 is a sequence chart illustrating a first exemplary embodiment of a SR-based uplink transmission method.

FIG. 3 is a sequence chart illustrating a first exemplary embodiment of a SR-based uplink transmission method.

Referring to FIG. 3, the communication system supporting NB-IoT may include a base station and a terminal. The base station may be the base station 110-1, 110-2, 110-3, 120-1, or 120-2 shown in FIG. 1, and the terminal may be the terminal 130-1, 130-2, 130-3, 130-4, 130-5, or 130-6 shown in FIG. 1. Each of the base station and terminal may be configured identically or similarly to the communication node 200 shown in FIG. 2.

The base station may generate the SR configuration information (e.g., SR configuration information defined in Tables 1 and 2) and may signal the SR configuration information to the terminal (S310). The terminal may receive the SR configuration information from the base station, and may identify information element(s) included in the SR configuration information. When sr-WithoutHARQ-ACK-Config is configured, the terminal may transmit a SR to the base station on a SR-PRACH.

When UL data to be transmitted to the base station occurs, the terminal may transmit a SR to the base station on a NPRACH (e.g., SR-PRACH) (S320). When the SR is transmitted, the terminal may start the SR-prohibit timer. Even when a UL grant, which is a response to the SR, is not received from the base station, the terminal may not perform a (re)transmission operation of the SR during a time corresponding to the SR-prohibit timer. The base station may receive the SR from the terminal, and based on the SR, the base station may determine that uplink data has occurred in the terminal. In this case, the base station may generate a UL grant for the uplink data and transmit the UL grant to the terminal on a narrowband physical downlink control channel (NPDCCH) (S330). The UL grant may be included in DCI.

The terminal may receive the UL grant (e.g., DCI) from the base station and may identify resource allocation information included in the UL grant. The terminal may transmit the UL data to the base station using resources indicated by the UL grant (S340). The UL data may be transmitted on a physical uplink shared channel (PUSCH) (e.g., narrowband PUSCH (NPUSCH)). The base station may receive the UL data from the terminal by performing a monitoring operation on the resources indicated by the UL grant.

Meanwhile, in order to successfully perform the above-described UL transmission procedure, UL timing between the terminal and the base station should be synchronized. The UL timing may be configured as follows.

Figure 4:
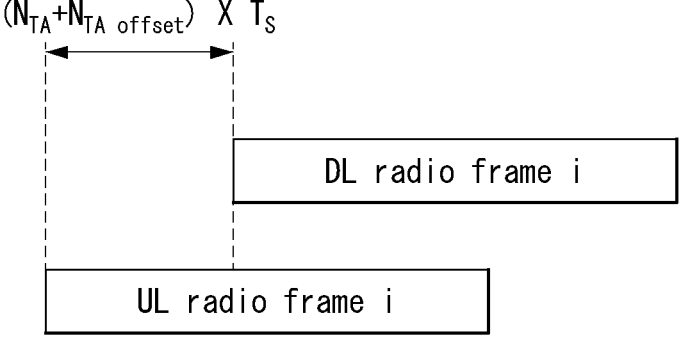
FIG. 4 is a conceptual diagram illustrating DL timing and UL timing in a communication system.

FIG. 4 is a conceptual diagram illustrating DL timing and UL timing in a communication system.

Referring to FIG. 4, a start time of a DL radio frame i may be a DL timing, and a start time of a UL radio frame i may be a UL timing. The UL timing may be ahead of the DL timing by $(N_{TA}+N_{TA\ offset})\times T_s$. $N_{TA\ offset}$ may be a constant provided by the communication system, and $N_{TA}$ may be set in a timing alignment procedure. $N_{TA\ offset}$ may be regarded as 0 if not set to a specific value. In an exemplary embodiment, $N_{TA\ offset}$ may be considered to be 0. $N_{TA}$ may be adjusted by a timing advance command (TAC) (e.g. TA) in the timing alignment procedure. TA may be delivered to the terminal through a random access response (RAR) or TAC MAC CE.

In the exemplary embodiment shown in FIG. 3, the base station receiving the SR may perform UL scheduling assuming that the UL timing is synchronized. Unlike the assumption of the base station, if UL timing synchronization between the terminal and the base station is not maintained, reception performance of UL data at the base station may deteriorate.

Figure 5:
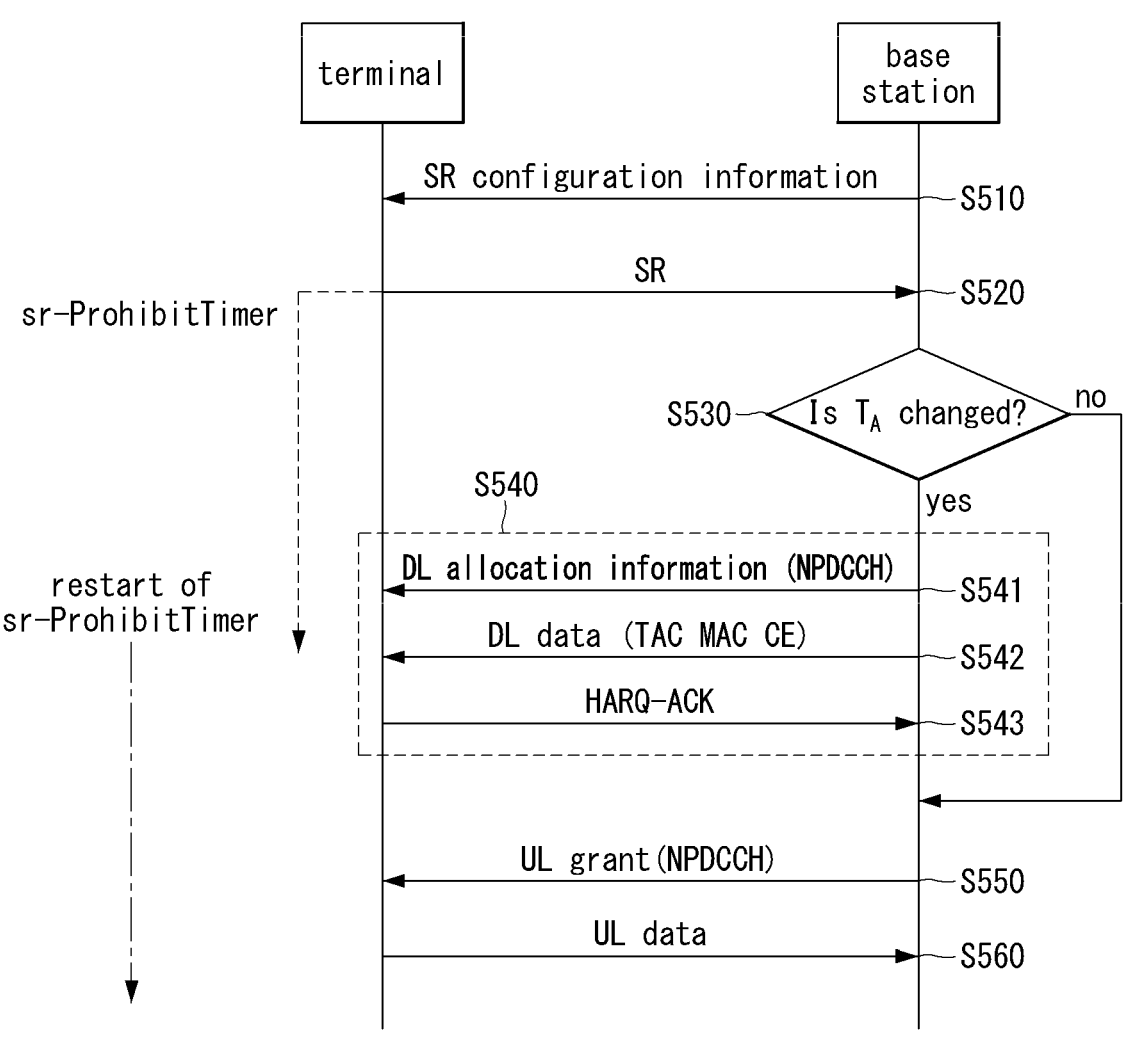
FIG. 5 is a sequence chart illustrating a second exemplary embodiment of a SR-based uplink transmission method.

FIG. 5 is a sequence chart illustrating a second exemplary embodiment of a SR-based uplink transmission method.

Referring to FIG. 5, the communication system supporting NB-IoT may include a base station and a terminal. The base station may be the base station 110-1, 110-2, 110-3, 120-1, or 120-2 shown in FIG. 1, and the terminal may be the terminal 130-1, 130-2, 130-3, 130-4, 130-5, or 130-6 shown in FIG. 1. Each of the base station and terminal may be configured identically or similarly to the communication node 200 shown in FIG. 2.

The base station may generate the SR configuration information (e.g., SR configuration information defined in Tables 1 and 2), and may signal the SR configuration information to the terminal (S510). The terminal may receive the SR configuration information from the base station, and may identify information element(s) included in the SR configuration information. When sr-WithoutHARQ-ACK-Config is configured, the terminal may transmit a SR to the base station on a SR-PRACH.

UL timing synchronization between the terminal and the base station may be in an acquired state based on ($N_{TA}+N_{TA}$ offset)$\times T_s$ shown in FIG. 4. For example, the UL timing synchronization between the terminal and the base station may be acquired by a synchronization procedure performed before the step S520. However, the UL timing synchronization between the terminal and the base station may not be maintained according to a change in a channel condition between the terminal and the base station, movement of the terminal, movement of the base station, and/or change in a distance between the terminal and the base station.

When UL data to be transmitted to the base station occurs, the terminal may transmit a SR to the base station on a NPRACH (e.g., SR-PRACH) (S520). When the SR is transmitted, the terminal may start the SR-prohibit timer. Even when a UL grant, which is a response to the SR, is not received from the base station during a time corresponding to the SR-prohibit timer, the terminal may not perform a (re)transmission operation of the SR. The base station may receive the SR from the terminal, and based on the SR, the base station may determine that the UL data has occurred in the terminal.

In addition, the base station may identify whether a TA is changed based on the SR received from the terminal (S530). If TA is changed (e.g., when the UL timing between the terminal and the base station is not synchronized), the base station may perform a timing alignment procedure (e.g., S540) with the terminal and then perform a UL transmission procedure (e.g., S550 and S560). If TA is not changed (e.g., when the UL timing between the terminal and the base station is synchronized), the base station may perform the UL transmission procedure (e.g., S550 and S560) without performing the timing alignment procedure (e.g., S540) with the terminal.

If $T_A$ estimated based on the SR received from the terminal is different from $T_A$ determined in the previous timing alignment procedure, the base station may perform the timing alignment procedure with the terminal (S540). For example, the base station may generate downlink (DL) allocation information for transmission of $T_A$ estimated based on the SR received from the terminal. The base station may transmit the DL allocation information to the terminal on a NPDCCH (S541). The DL allocation information may be included in DCI. The terminal may receive the DL allocation information from the base station. The DCI including the DL allocation information may be scrambled by a radio network temporary identifier (e.g., TAC-RNTI) indicating that the corresponding DCI schedules transmission of a TAC MAC CE. The TAC-RNTI may be preconfigured between the base station and the terminal. For example, the TAC-RNTI may be included in the SR configuration information.

The base station may generate the TAC MAC CE including $T_A$ (e.g., $T_A$ estimated based on the SR received from the terminal), and transmit the TAC MAC CE to the terminal using resources indicated by the DL allocation information (S542). The terminal may receive the TAC MAC CE from the base station by performing a monitoring operation on the resources indicated by the DL allocation information. The terminal may identify $T_A$ included in the TAC MAC CE. In this case, the terminal may determine that UL timing alignment based on $T_A$ included in the TAC MAC CE is required. Accordingly, the terminal may align UL timing based on $T_A$ included in the TAC MAC CE. When the UL timing is synchronized, the terminal may transmit a HARQ-ACK for the TAC MAC CE to the base station (S543). The base station may receive the HARQ-ACK from the terminal. When the HARQ-ACK indicates ACK, the base station may determine that the UL timing alignment procedure is completed in the terminal.

Meanwhile, when the timing alignment procedure (e.g., S540) is performed before the UL transmission procedure (e.g., S550 and S560) is performed, the SR-prohibit timer may need to be adjusted. For example, the SR-prohibit timer may be updated or (re)started in consideration of the time of performing the timing alignment procedure (e.g., S540). In exemplary embodiments, (re)start may mean start or restart. When the DCI scheduling the TAC MAC CE is received or when the TAC MAC CE is received, the terminal may update or (re)start the SR-prohibit timer. When the SR configuration information received in the step S510 includes sr-ProhibitTimer-extended, the terminal may update (or extend) the SR-prohibit timer by a time corresponding to sr-ProhibitTimer-extended. Alternatively, when the DCI scheduling the TAC MAC CE is received or when the TAC MAC CE is received, the terminal may terminate the current SR-prohibit timer, and may (re)start the SR-prohibit timer according to sr-ProhibitTimer included in the SR configuration information received in the step S510.

When the timing alignment procedure (e.g., S540) is completed or when it is determined that the $T_A$ is not changed in the step S530, the base station may transmit a UL grant for the uplink data to the terminal on a NPDCCH (S550). The UL grant may be included in DCI.

The terminal may receive the UL grant from the base station and may identify resource allocation information included in the UL grant. The terminal may transmit the UL data to the base station using resources indicated by the UL grant (S560). The UL data may be transmitted on a physical uplink shared channel (PUSCH) (e.g., NPUSCH). The base station may receive the UL data from the terminal by performing a monitoring operation on the resources indicated by the UL grant.

Meanwhile, for simplification of the procedure, one MAC CE (e.g., MAC PDU) may be used for UL timing alignment and UL grant transmission. A simplified procedure may be performed as follows.

Figure 6:
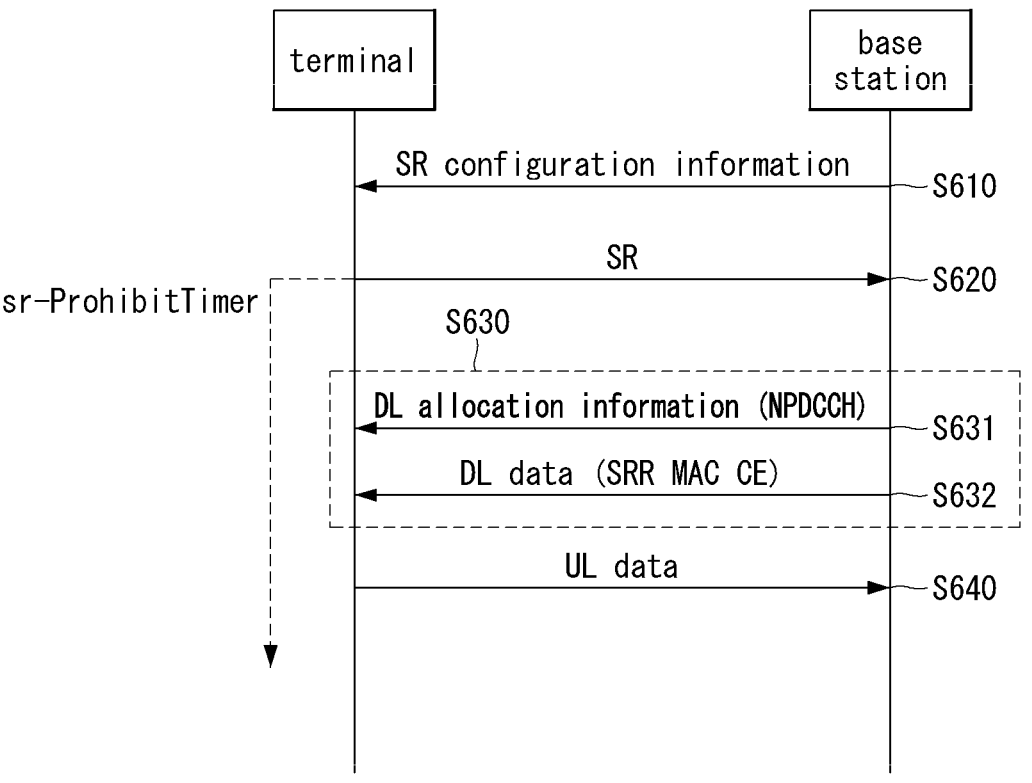
FIG. 6 is a sequence chart illustrating a third exemplary embodiment of a SR-based uplink transmission method.

FIG. 6 is a sequence chart illustrating a third exemplary embodiment of a SR-based uplink transmission method.

Referring to FIG. 6, the communication system supporting NB-IoT may include a base station and a terminal. The base station may be the base station 110-1, 110-2, 110-3,

120-1, or 120-2 shown in FIG. 1, and the terminal may be the terminal 130-1, 130-2, 130-3, 130-4, 130-5, or 130-6 shown in FIG. 1. Each of the base station and terminal may be configured identically or similarly to the communication node 200 shown in FIG. 2.

The base station may generate the SR configuration information (e.g., SR configuration information defined in Tables 1 and 2), and may signal the SR configuration information to the terminal (S610). The terminal may receive the SR configuration information from the base station, and may identify information element(s) included in the SR configuration information. When sr-WithoutHARQ-ACK-Config is configured, the terminal may transmit a SR to the base station on a SR-PRACH.

UL timing synchronization between the terminal and the base station may be may be in an acquired state based on $(N_{TA}+N_{TA\ offset}) \times T_s$ shown in FIG. 4. However, the UL timing synchronization between the terminal and the base station may not be maintained according to a change in a channel condition between the terminal and the base station, movement of the terminal, movement of the base station, and/or change in a distance between the terminal and the base station.

When UL data to be transmitted to the base station occurs, the terminal may transmit a SR to the base station on a NPRACH (e.g., SR-PRACH) (S620). When the SR is transmitted, the terminal may start the SR-prohibit timer. Even when a UL grant, which is a response to the SR, is not received from the base station, the terminal may not perform a (re)transmission operation of the SR during a time corresponding to the SR-prohibit timer. The base station may receive the SR from the terminal, and based on the SR, the base station may determine that the UL data has occurred in the terminal.

In addition, the base station may identify whether $T_A$ is changed based on the SR received from the terminal. If $T_A$ is changed (e.g., when the UL timing between the terminal and the base station is not synchronized), the base station may perform a transmission procedure of one MAC CE (hereinafter, referred to as 'scheduling request response (SRR) MAC CE)') for UL timing alignment and UL grant transmission (S630). If $T_A$ is not changed (e.g., when the UL timing between the terminal and the base station is synchronized), the base station may perform the UL transmission procedure (e.g., S550 and S560) shown in FIG. 5.

If $T_A$ estimated based on the SR received from the terminal is different from $T_A$ determined in the previous timing alignment procedure, the base station may generate DL allocation information for transmission of the SRR MAC CE. The base station may transmit the DL allocation information to the terminal on a NPDCCH (S631). The DL allocation information may be included in DCI. The terminal may receive the DL allocation information from the base station. The DCI including the DL allocation information may be scrambled by a SRR-RNTI indicating that the corresponding DCI schedules transmission of a SRR MAC CE. The SRR-RNTI may be preconfigured between the base station and the terminal. For example, the SRR-RNTI may be included in the SR configuration information.

The base station may generate the SRR MAC CE including $T_A$ (e.g., $T_A$ estimated based on the SR received from the terminal) and the UL grant. The SRR MAC CE may be configured as follows.

Figure 7:
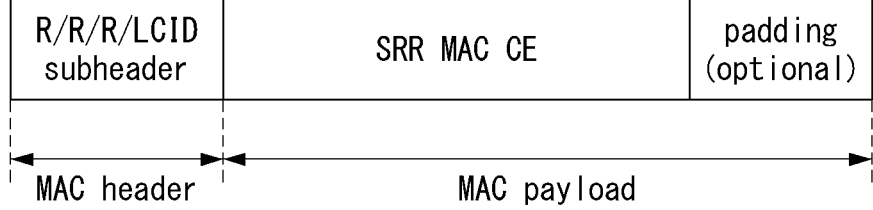
FIG. 7 is a block diagram illustrating a first exemplary embodiment of a MAC protocol data unit (PDU) including an SRR MAC CE.

FIG. 7 is a block diagram illustrating a first exemplary embodiment of a MAC protocol data unit (PDU) including an SRR MAC CE.

Referring to FIG. 7, a MAC PDU may include a MAC header and a MAC payload. The MAC header may include a subheader (e.g., R/R/R/LCID subheader). The MAC payload may include the SRR MAC CE. Also, the MAC payload may further include padding when needed. The subheader may be configured as follows.

Figure 8:
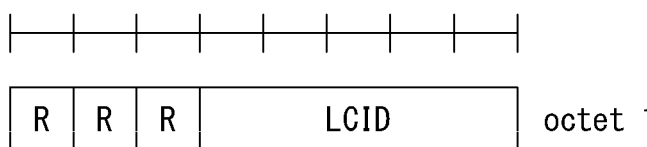
FIG. 8 is a block diagram illustrating a first exemplary embodiment of a subheader.

FIG. 8 is a block diagram illustrating a first exemplary embodiment of a subheader. Referring to FIG. 8, the size of the subheader may be 1 octet. The subheader may include reserved bits (R) and a logical channel identifier (LCID). The size of the reserved bits may be 3 bits, and the size of the LCID may be 5 bits. The LCID may indicate that the type of the MAC PDU (e.g., MAC CE) including the corresponding LCID is SRR. A value of the LCID may be set as shown in Table 3 below.

TABLE 3

| Codepoint/index | LCID value |
|---|---|
| 01011 | SRR |

The SRR MAC CE shown in FIG. 7 may be configured as follows.

Figure 9:
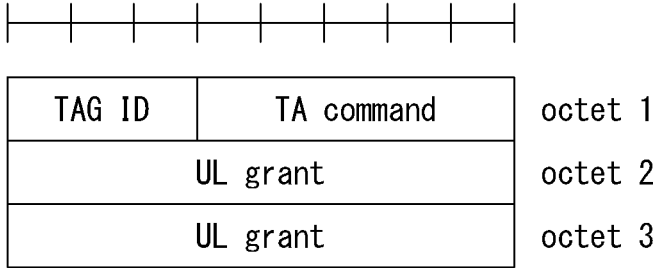
FIG. 9 is a block diagram illustrating a first exemplary embodiment of a SRR MAC CE.

FIG. 9 is a block diagram illustrating a first exemplary embodiment of a SRR MAC CE.

Referring to FIG. 9, the SRR MAC CE may include a timing advance group (TAG) ID, a timing advance (TA) command, and a UL grant. The size of the TAG ID may be 2 bits, the size of the TA command may be 6 bits, and the size of the UL grant may be 16 bits. The TAG ID may indicate a TAG to which the base station (e.g., serving base station) belongs. The TA command may be the TA estimated based on the SR received from the terminal. The TA command may indicate one value among 0, 1, 2, 3, . . . , and 63. The UL grant may be resource allocation information for the UL data associated with the SR received from the terminal. The UL grant may include one or more information elements defined in Table 4 below.

TABLE 4

| Information elements |
|---|
| UL subcarrier spacing (1 bit) |
| Subcarrier indication (6 bits) |
| Scheduling delay (2 bits) |
| Number of repetitions (3 bits) |
| MCS index (3 bits) |
| HARQ process number (1 bit) |

The UL grant may include time domain resource allocation information and/or frequency domain resource allocation information for the UL data. The MCS index may indicate a transport block size (TBS), a modulation scheme, and/or the number of resource units (RUs). Alternatively, the MAC PDU may include a plurality of MAC subPDUs. In this case, the TA command and the UL grant may be included in different MAC subPDUs. For example, a first MAC subPDU may include the TA command, and a second MAC subPDU may include the UL grant.

Referring again to FIG. 6, the base station may transmit the SRR MAC CE (e.g., DL data) to the terminal using the resources indicated by the DL allocation information (S632). The terminal may receive the MAC PDU (e.g., MAC PDU including the SRR MAC CE) from the base station by performing a monitoring operation on the resources indicated by the DL allocation information. The terminal may determine that the corresponding MAC PDU includes the SRR MAC CE based on the LCID included in the MAC header of the MAC PDU. The terminal may obtain the SRR MAC CE included in the MAC PDU and may identify the TA command (e.g., TA) included in the SRR MAC CE. In this case, the terminal may determine that UL timing alignment based on the TA included in the SRR MAC CE is required. Accordingly, the terminal may align UL timing based on the TA included in the SRR MAC CE. The terminal may start or restart a timeAlignmentTimer associated with the TAG included in the SRR MAC CE.

In addition, the terminal may identify the UL grant included in the SRR MAC CE and transmit the UL data to the base station using resources indicated by the UL grant (S640). When the MAC PDU received from the base station includes the SRR MAC CE, the terminal may not transmit a HARQ-ACK for the corresponding MAC PDU to the base station. A HARQ-ACK transmission procedure for the SRR MAC CE between the base station and the terminal may be preconfigured not to be performed. In this case, the UL data transmitted in the step S640 may imply that the SRR MAC CE is successfully received by the terminal. The step S640 may be performed after synchronization of UL timing between the terminal and the base station. The UL data may be transmitted on a PUSCH (e.g., NPUSCH). The base station may receive the UL data from the terminal by performing a monitoring operation on the resources indicated by the UL grant. When the UL data is successfully received from the terminal, the base station may determine that the SRR MAC CE is successfully received from the terminal.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. An operation method of a terminal in a communication system, the operation method comprising:

in response to occurrence of uplink (UL) data, transmitting a scheduling request (SR) for the UL data to a base station;

performing a UL timing alignment procedure with the base station when a UL timing between the terminal and the base station is not synchronized;

receiving a UL grant for the UL data from the base station; and transmitting the UL data to the base station using resources indicated by the UL grant, wherein a timing advance command (TAC) medium access control (MAC) control element (CE) including information for uplink timing synchronization is received in the UL timing alignment procedure, a SR-prohibit timer is started when the SR is transmitted, the SR-prohibit timer is terminated when the TAC MAC CE is received, and a transmission operation or a retransmission operation of the SR is not performed during a time corresponding to the SR-prohibit timer.

2. The operation method according to claim 1, wherein the performing of the UL timing alignment procedure comprises:

receiving downlink (DL) allocation information from the base station;

receiving the TAC MAC CE from the base station using resources indicated by the DL allocation information;

aligning the UL timing synchronization between the terminal and the base station based on a TAC included in the TAC MAC CE; and transmitting a hybrid automatic repeat request (HARQ)-acknowledgement (ACK) for the TAC MAC CE to the base station.

3. The operation method according to claim 2, wherein the DL allocation information is included in downlink control information (DCI), and the DCI is scrambled by a radio temporary network identifier (RNTI) indicating transmission of the TAC MAC CE.

4. The operation method according to claim 2, wherein the SR is transmitted on a narrowband physical random access channel (NPRACH), and each of the DL allocation information and the UL grant is received on a narrowband physical downlink control channel (NPDCCH).

5. The operation method according to claim 1, further comprising performing a synchronization procedure with the base station before transmitting the SR to the base station, wherein the UL timing alignment procedure is performed before transmission of the UL data when a UL timing determined by the synchronization procedure needs to be adjusted.

6. An operation method of a base station in a communication system, the operation method comprising:

configuring a scheduling request (SR)-prohibit timer;

transmitting SR configuration information including the SR-prohibit timer to a terminal;

receiving an SR for uplink (UL) data from the terminal;

performing a UL timing alignment procedure with the terminal when a UL timing between the terminal and the base station is not synchronized;

transmitting a UL grant for the UL data to the terminal; and receiving the UL data from the terminal through resources indicated by the UL grant, wherein the SR-prohibit timer is started when the terminal transmits the SR, and a transmission operation or a retransmission operation of the SR is not performed during a time corresponding to the SR-prohibit timer.

7. The operation method according to claim 6, wherein the performing of the UL timing alignment procedure comprises:

transmitting downlink (DL) allocation information to the terminal;

transmitting a timing advance command (TAC) medium access control (MAC) control element (CE) to the terminal using resources indicated by the DL allocation information; and receiving a hybrid automatic repeat request (HARQ)-acknowledgement (ACK) for the TAC MAC CE from the terminal.

8. The operation method according to claim 7, wherein the SR is received on a narrowband physical random access channel (NPRACH), and each of the DL allocation information and the UL grant is transmitted on a narrowband physical downlink control channel (NPDCCH).

9. The operation method according to claim 6, further comprising performing a synchronization procedure with the terminal before receiving the SR, wherein the UL timing alignment procedure is performed before reception of the UL data when a UL timing determined by the synchronization procedure needs to be adjusted.

10. An operation method of a terminal in a communication system, the operation method comprising:

in response to occurrence of uplink (UL) data, transmitting a scheduling request (SR) for the UL data to a base station;

receiving downlink (DL) allocation information from the base station;

receiving a medium access control (MAC) protocol data unit (PDU) from the base station using resources indicated by the DL allocation information, the MAC PDU including a timing advance command (TAC) for UL timing alignment between the terminal and the base station and a UL grant for the UL data;

aligning UL timing synchronization between the terminal and the base station based on the TAC; and transmitting the UL data to the base station using resources indicated by the UL grant, wherein a SR-prohibit timer is started when the SR is transmitted, the SR-prohibit timer is terminated when the TAC is received, and a transmission operation or a retransmission operation of the SR is not performed during a time corresponding to the SR-prohibit timer.

11. The operation method according to claim 10, further comprising performing a synchronization procedure with the base station before transmitting the SR to the base station, wherein the MAC PDU is received when a UL timing determined by the synchronization procedure needs to be adjusted.

12. The operation method according to claim 10, wherein the MAC PDU includes a MAC header and a MAC payload, the MAC payload is a scheduling request response (SRR) MAC control element (CE) including the TAC and the UL grant, and a logical channel identifier (LCID) included in the MAC header indicates that the MAC PDU includes the SRR MAC CE.

13. The operation method according to claim 12, wherein the DL allocation information is included in downlink control information (DCI), and the DCI is scrambled by a radio temporary network identifier (RNTI) indicating transmission of the SRR MAC CE.

14. The operation method according to claim 10, wherein a hybrid automatic repeat request (HARQ)-acknowledgment (ACK) for the MAC PDU is configured not to be transmitted.

* * * * *